| Control Switch Sequence | | | | | |
|---|---|---|---|---|---|
| Contact | Inch | Off | Rider Start | Slow | Run |
| 112 | | | O | O | O |
| 122 | | | | O | O |
| 23 | O | | | | |
| 127 | | | | | O |
| 123 | | | | O | |
| 124 | | | | | O |
| 31 | O | | | | |

Spring Return From Inch

United States Patent Office 2,743,151
Patented Apr. 24, 1956

2,743,151
MOTOR CONTROLLED TENSIONING SYSTEM WITH INERTIA COMPENSATION

William T. Hunt, Jr., New York, and Charlton H. Storey, Jr., Buffalo, N. Y., assignors to Westinghouse Electric Corporation, East Pittsburgh, Pa., a corporation of Pennsylvania Application July 29, 1953, Serial No. 370,931

42 Claims. (Cl. 318—6)

This invention relates to electrical control systems and, more particularly, to regulated electrical control systems for variable voltage drives.

Present production requirements in industry dictate that electrical drive systems operate at high speeds and have high rates of acceleration and retardation. In order to achieve the required speeds and rates of acceleration and retardation, it is necessary to work the electrical equipment to its maximum capacity. When working the electrical equipment to its maximum capacity, a current limit control is desirable.

In applications of the electrical drive systems where the drive motor is used to drive a take-up reel or a windup roll such as is used in modern paper making, it is necessary to change the speed of a load having a variable inertia (i. e. the inertia varies with the amount of material on the coil) to keep a constant tension in the strip of material. To accomplish this result, a core type unwind stand which is mechanically coupled to drive an unwind braking generator is provided. Armature current of the unwind braking generator sets the tension in the strip when the system is run at a constant speed. During a change of speed, however, the tension in the strip depends not only on the armature current of the unwind braking generator, but also upon the torque necessary to change the rate of speed of the unwind roll or reel and the unwind braking generator. Thus, in order to maintain the desired tension in the strip, the armature current of the braking generator must be reduced during acceleration and increased during retardation, this is called inertia compensation. Stated in another way, inertia compensation is the recalibration of the armature current regulator for the unwind generator as is necessary to accelerate or retard the windup reel or roll motor and the windup reel or roll maintaining constant tension.

The alternative to a current limit scheme of control for line speed is the motor operated rheostat. When a motor operated rheostat is used, the problem of inertia compensation is fairly easy since relays can be actuated at the same time the rheostat is set in motion. When a current limit device is used, the problem of inertia compensation becomes one of measuring and compensating for a variable rate of change when means for applying and removing inertia compensation is not readily available.

It is an object of this invention to provide means for applying and removing inertia compensation in an electrical drive system.

It is a more specific object of this invention to provide a system for applying and removing inertia compensation from a current limit type electrical drive system.

Other objects and advantages of this invention will become more apparent from a study of the following specification and the accompanying drawings in which:

Figs. 1A, 1B and 1C combined illustrate the invention diagrammatically as applied to and combined with a winder and slitter drive;

Figs. 1A, 1B and 1D combined illustrate the invention diagrammatically utilizing a regulating generator as applied to and combined with a winder and slitter drive;

Although the current limit drive system is shown and described in our copending application filed February 27, 1953, Serial No. 339,436 and entitled Magnetic Amplifier Regulated Current Limit Control, it is shown and described in this application in order to give a complete picture of the drive system.

Figure 1A:
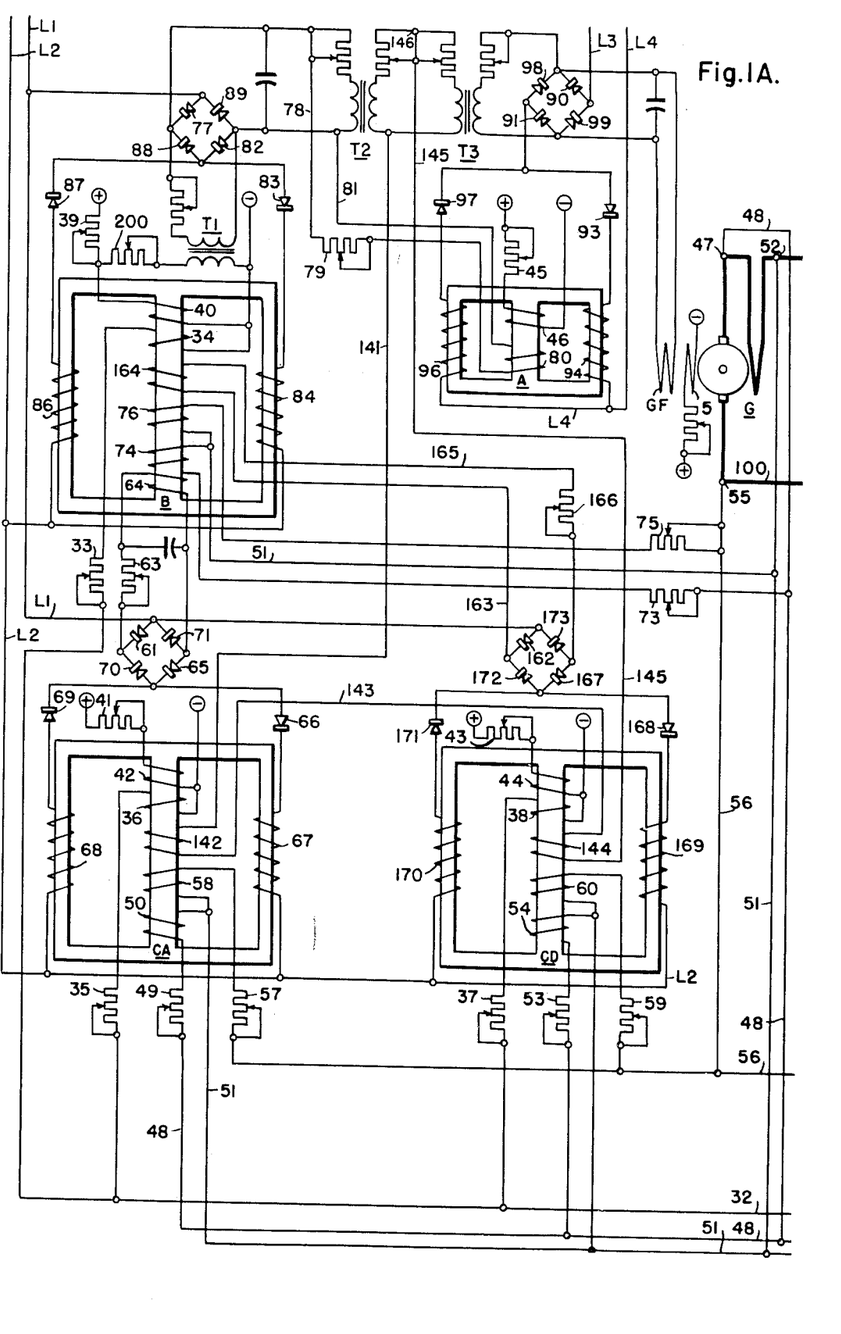
Figures 1A and 1B in combination show the electrical drive system with current limit.
Figure 1B:
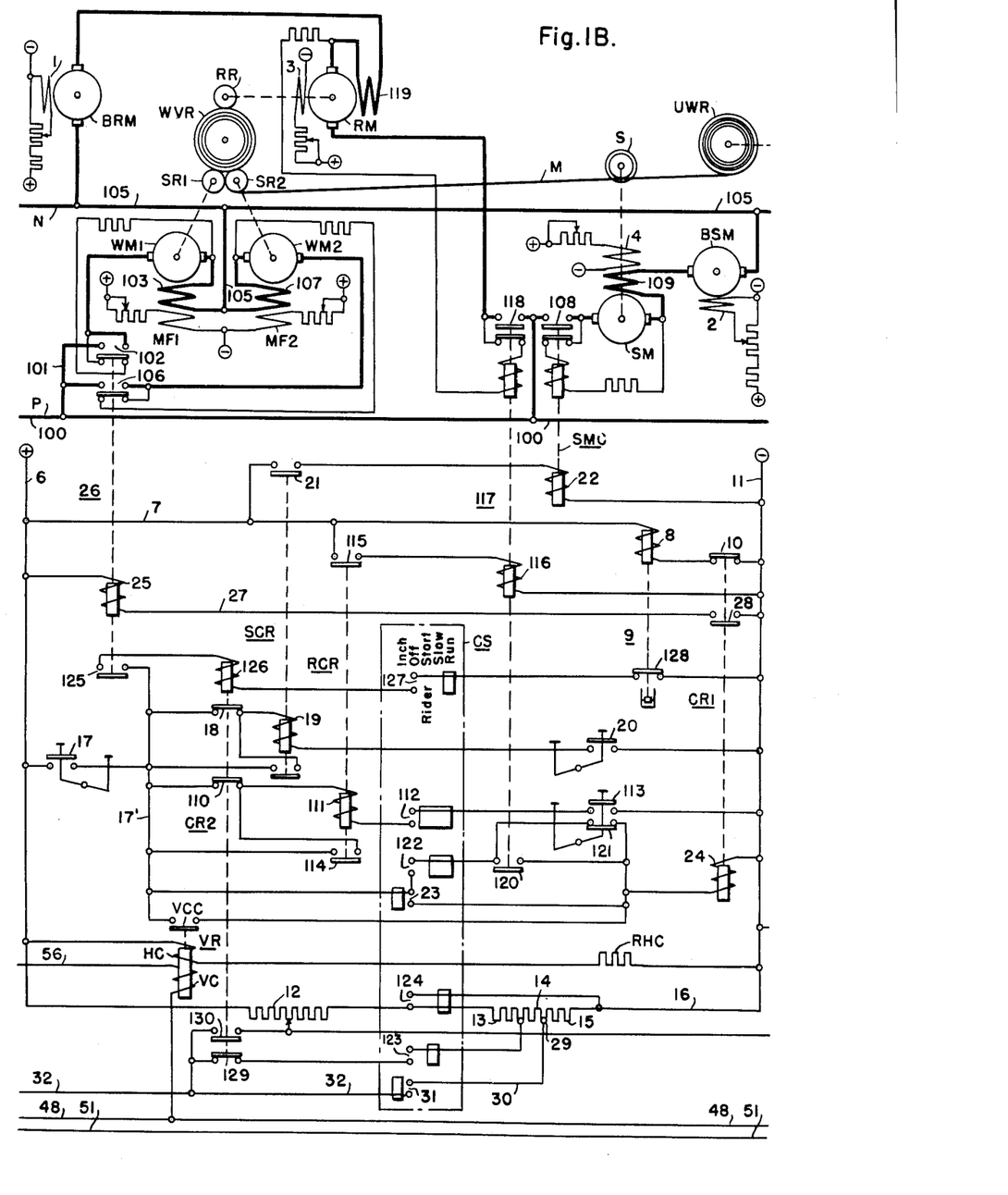

In Figs. 1A and 1B the main generator G is shown connected in loop circuits with a plurality of load driving motors, namely the winder motors WM1 and WM2, the rider-roll motor RM, or motors when two are used as is usually the case, and the slitter motor SM. A booster generator BRM is connected in series with the rider-roll motor RM and a booster generator BSM is connected in series with the slitter motor SM.

All of these dynamoelectric machines, namely, the generators G, BRM and BSM and the motors WM1, WM2, RM, and SM are provided with separately excited field windings 5, 1 and 2, and MF1, MF2, 3 and 4. The control of the excitation of the field windings 1, 2, 3, 4, 5, MF1 and MF2 is not part of our invention, and we have, therefore, shown these field windings connected to suitable sources of constant voltage direct current supply terminals. The current limit control system is primarily directed to the control of the excitation of the field winding GF of the main generator G.

The generator field winding GF is connected to the output circuit of the magnetic amplifier A. This magnetic amplifier A has a bias winding 46, a control winding 80, and the two main windings 94 and 96.

The control winding 80 is connected in the output circuit of the second stage magnetic amplifier B. This magnetic amplifier B has a bias winding 40, a pattern winding 34, two current limit control windings 64 and 164, a voltage winding 76, an IR drop winding 74, and the two main windings 84 and 86 for supplying the input to the winding of the magnetic amplifier A. Current limit control winding 64 of the magnetic amplifier B is connected to the output circuit of the accelerating current limit magnetic amplifier CA and the other current limit control winding 164 is connected to the output circuit of the decelerating current limit magnetic amplifier CD.

A better understanding of our invention may be had from a study of typical operating cycles of the combination to which our invention is supplied.

Let the assumption be that all the terminals shown are appropriately energized and that all the generators are driven by suitable prime movers not shown. All the field windings, mentioned except GF, will be energized, all the bias windings for the magnetic amplifiers will be energized, and the control leads 6 and 11 will be energized.

When leads 6 and 11 are energized a circuit is established from positive lead 6, through conductor 7, actuating coil 8 of the time limit relay 9, back contacts 10 of the control relay CR1 to the negative lead 11. The time limit relay operates substantially instantly to open contacts 128. When coil 8 of the time limit relay 9 is deenergized, the contacts 128 close only after the lapse of a selected time interval.

Another circuit is established from the positive conductor 6, through the resistor sections 12, 13, 14, and 15, and conductor 16 to the negative lead 11. The utility of this circuit will become apparent as the description proceeds.

If the windup-reel WUR is empty and the unwind-reel UWR full and the material M is not yet threaded through the slitter and over the rolls of the surface winding then a slow winding or inching speed is desirable. Further, since the slitter knives must rotate when threading material it is important that the slitter S be started before the motors WM1 and WM2 are started. Switch 20 is thus operated to closed position and remains in the closed position, and the controller switch CS is moved to the left for inching operation. Switch 17 is now moved to closed position and a circuit is established from lead 6 through switch 17 to conductor 17', back contacts 18 of control relay CR2, actuating coil 19 of the splitter control relay SCR, a switch 20 and the negative lead 11. Control relay SCR thus operates to close contacts 21 to energize the actuating coil 22 of the slitter motor contactor SMC.

Another circuit is established from lead 6 through switch 17 to conductor 17', switch contacts 23 of the controller switch CS and actuating coil 24 of the control relay CR1 to negative lead 11. Operation of control relay CR1 effects the closing of contacts 28 to thus establish a circuit from lead 6 through the actuating coil 25 of the winder motor contactor 26, conductor 27, and contacts 28 to lead 11.

Since the controller switch CS, is in the inch position a circuit is established from the junction 29 through conductor 30, controller switch 31 to conductor 32. Since the junction 29 is separated from the negative lead by the resistor 15 only it is apparent that conductor 32 is of positive potential but of rather low voltage.

The pattern windings 34, 36 and 38, connected in series with the adjustable resistors 33, 35 and 37, respectively, are connected in parallel from conductor 32 across resistor section 15 to the negative lead 11. (See Fig. 1A.)

The bias windings 40, 42, 44 and 46, connected in series with adjustable resistors 39, 41, 43 and 45, respectively, are all connected in parallel across leads 6 and 11.

The magnetic amplifier CA has a control winding 50 responsive to the current in the generator armature circuit. The circuit for this winding may be traced from the negative junction 47 through conductor 48, adjustable resistor 49, "current" winding 50, conductor 51 to the less negative junction 52.

The magnetic amplifier CD also has a current winding 54. The circuit for this curent winding 54 may be traced from conductor 48 through adjustable resistor 53, current winding 54 to conductor 51. Since the magnetic amplifier CD is provided to effect current limit control during deceleration, and for reverse operation, namely when junction 52 is negative with respect to junction 47, the current winding 54 is so wound on the core of the magnetic amplifier CD as to reduce the output of this magnetic amplifier with rise in current value through winding 54.

The magnetic amplifier CA also has a voltage winding 58. The circuit for this winding may be traced from the positive terminal or junction 55 of generator G through conductor 56, adjustable resistor 57, voltage winding 58 to conductor 51. A similar circuit including adjustable resistor 59 and the voltage winding 60 is provided for the amplifier CD.

Figure 2:
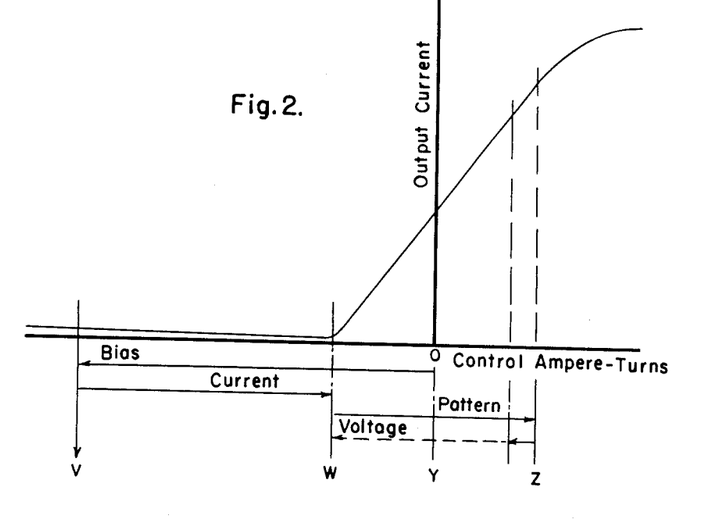
Fig. 2 shows the characteristic transfer curve of a magnetic amplifier.

Since the current winding 50 and the voltage winding 58 are both substantially unexcited at the moment, the output of magnetic amplifier CA is very low, as at point W of Fig. 2, the control winding 64 of the magnetic amplifier B is excited at a rather low value. The output circuit for magnetic amplifier CA may be traced from the alternating current lead L1, when this lead is positive, through rectifier 61, adjustable resistor 63, control winding 64, rectifiers 65 and 66, main winding 67 to lead L2, and from lead L2, when this lead is positive, through main winding 68, rectifiers 69 and 70, adjustable resistor 63, control winding 64 and rectifier 71 to lead L1.

The second stage magnetic amplifier also has control windings 74 and 76 that are responsive respectively to the armature current and voltage of the generator G. The circuit for the current winding 74 may be traced from conductor 48 through adjustable resistor 73, current coil 74, to conductor 51, and the circuit for the voltage winding 76 may be traced from junction 55 through the adjustable resistor 75, voltage winding 76 to conductor 51.

Since the control winding 64 is energized at a rather low value and the current and voltage windings 74 and 76 are substantially unenergized at the operating condition under consideration, the output of magnetic amplifier B is rather low. The output from this magnetic amplifier is supplied to the power magnetic amplifier A. The circuit may be traced from lead L1, when this lead is positive, through rectifier 77, conductor 78, adjustable resistor 79, control winding 80, conductor 81, rectifiers 82 and 83, main winding 84 to lead L2, and from lead L2, when this lead is positive, through main winding 86, rectifiers 87 and 88, conductor 78, adjustable resistor 79, control winding 80, conductor 81, and rectifier 89 to lead L1.

The output of the power magnetic amplifier A is supplied directly to the generator field winding GF. The circuit may be traced from lead L3, when this lead is positive, through rectifier 90, field winding GF, rectifiers 91 and 93, main winding 94 to lead L4, and from lead L4, when this lead is positive, through main winding 96, rectifiers 97 and 98, the generator field winding GF, and rectifier 99 to lead L3.

For the conditions of operation under discussion the field GF is excited at a low value and the motors coupled to the generator G will operate at inching speed. The only motors connected to the generator at the moment are the winder motors and the slitter motor. This is so because as hereinabove explained the contactors SMC and 26 are in operated position.

When the contactor 26 operated a circuit was established from the positive terminal, or junction 55, of the generator G through conductors 100 and 101, contacts 102 of contactor 26, the armature of winder motor WM1, the series field winding 103 to the negative conductor 105. The armature of the winder motor WM2 is connected in a parallel circuit that may be traced from conductor 100 through contacts 106 of contactor 26, the armature of motor WM2 and the series field winding 107 to the negative conductor 105.

The circuit for the slitter motor is traced from conductor 100 through contacts 108 of contactor SMC, the armature winding of the slitter motor SM, the series field winding 109 and the armature of the booster generator BSM to the negative conductor 105.

The motors WM1, WM2, and SM thus operate at inching speed to thread the material M through the slitter S and over the surface rolls SR1 and SR2 onto the windup reel WUR. If the speed is too fast, or for some reasons an especially low speed is needed on the drive, switch 17 may be operated intermittently to thus alternately connect and disconnect the winder motors and slitter motor.

As the material M is passed over the windup reel and is to be passed under the rider-roll RR the rider roll motor is to be started. This is accomplished by depressing switch 113 and moving the controller switch CS to the "Rider start" position. A circuit is then established from conductor 17', through back contacts 110 of control relay CR2, the actuating coil 111 of the rider roll control relay RCR, controller contacts 112, switch contacts 113 to the negative conductor 11. Relay RCR after it has operated holds itself in through contacts 114 and closes contacts 115.

The closure of contacts 115 establishes a circuit from conductor 7 through contacts 115, actuating coil 116 of the contactor 117 to the negative conductor 11. The operation of contactor 117 closes the contacts 118 to establish a circuit from conductor 100 through contacts 118, the armature winding of motor RM, series field 119, the armature winding of the booster generator BRM to conductor 105. The rider roll motor thus operates at inching speed to permit the threading of the material under the rider roll RR.

It is normally not necessary to drive the rider roll during inching. To positively drive it, as here pointed out does aid in the threading operation.

The operation of the contactor 117 also closes the contacts 120. By releasing switch 113, the contacts 121 are closed. Control relay CR1 may thus be energized through the controller switch contacts 122. This is only of importance if the apparatus had been at rest and the material M in the machine and no preliminary inching operation is necessary and the controller switch CS had been moved directly to the slow speed position.

For the sequence of operation being discussed the control relay CR1 remains picked up. This will be apparent from the following paragraph.

When leads 6 and 11 are energized the holding coil HC of the VR relay is connected to these leads through the resistor RHC. The resistance value of this resistor RHC is so chosen that the VR relay does not pick up. However, when the voltage coil VC, connected across the conductors 48 and 56 and thus responsive to the voltage of the generator G, is energized, the VR relay picks up to close contacts VCC. This means that during inching operation the VR relay picks up. Thereafter the energization of coil 24 of the control relay CR1 is independent of the controller switch contacts 23.

When the controller switch CS is moved to the "Slow" position the actuating coil 24 of the control relay CR1 is provided with a holding circuit through contacts 121 and 122. The contacts 123 are also closed. This means that conductor 32, now being connected between resistors 13 and 14 through contacts 123 and 129, is made more positive. The excitation of field GF is thus increased somewhat to operate the motors connected to generator G at somewhat higher than inching speed but still at a slow speed.

If full running speed is desired the controller is moved to the "Run" position, whereupon a circuit is established through switch contacts 124, and the shunt across resistor sections 13, 14 and 15 to thus increase the excitation of the generator G.

Since switch contacts 127 are also closed by the operation of the controller to the "Run" position and since the contacts 128 of the time limit relay 9 are closed, a circuit is established from conductor 17' through contacts 125 of the contactor 26, actuating coil 126 of control relay CR2, contacts 127 and 128 to the lead 11. The operation of control relay CR2 effects the opening of contacts 18, 110, and 129 and the closing of contacts 130. The conductor 32 is thus excited at maximum positive value which means that the windings 34, 36 and 38 of the amplifiers B, CA, and CD, respectively are excited at maximum value. The result is that the generator field winding GF is excited at maximum value to cause the machine elements to operate at maximum speed.

Conductor 32 is positive by an amount determined by the adjustment of potentiometer 12, which adjustment is controlled manually by the operator. The operator can thus determine at what speed the winder will run.

When no inching operation precedes the starting operation and the controller CS is moved from the "Off" position through the "Rider start" and the "Slow" positions to the "Run" position, then resistor sections 14 and 15, and then 13 are shunted in the sequence named, and after the lapse of a selected interval of time, as determined by time limit relay 9, a portion of resistor 12 is shunted. The speed increase is thus effected in three distinct steps.

In a drive of the kind shown the total accelerating load on the generator is likely to be large, because the $WR^2$ is large, and in consequence, the generator armature current required to accelerate the motors at the rate the main generator voltage is increasing is likely to be excessive. To limit the current to safe values the magnetic amplifiers are controlled as a function of generator armature current and generator voltage.

Fig. 2 shows the characteristic transfer curve of a magnetic amplifier, as the magnetic amplifier CA. When the bias winding 42 alone is excited the magnetic amplifier operates at point V of the showing in Fig. 2. The use of the current winding 50, the pattern winding 36, and the voltage windings 58 is to obtain current limit control during acceleration, or for that matter at any time when the generator armature current exceeds a selected value.

Figure 3:
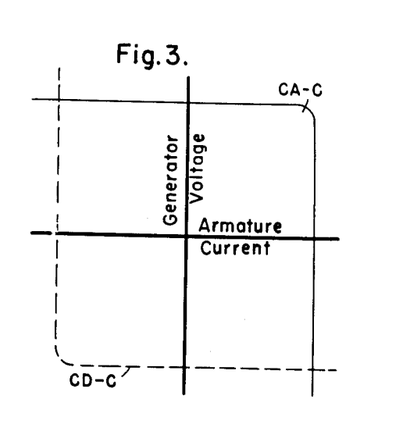
Fig. 3 shows the curves illustrating the changes in main generator voltage with changes in motor armature current both for the accelerating and the decelerating periods of the motor.
Figure 4:
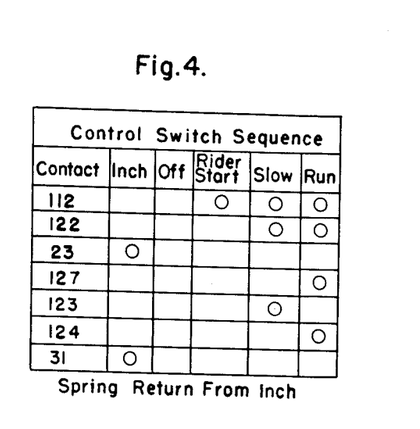
Fig. 4 shows a sequence chart of the control operations of the invention in combination with a paper winder and slitter.

When the generator armature current is near the desired upper limit, the ampere turns in the current winding 50 will cause the magnetic amplifier CA to operate at point W. (See Fig. 2.) The pattern winding 36 is wound to bring the operation of the magnetic amplifier to point Z. This point Z is selected on the straight portion of the curve. At point Z the output of the accelerating control amplifier CA is high enough to produce, in the current control winding 64 of magnetic amplifier B, enough ampere turns to balance the ampere turns of the pattern winding 34. As the motors WM1 and WM2, connected to the generator will accelerate when the current is limited at its maximum value, the back electromotive force of the motor begins to increase. This would tend to decrease the armature current, and ampere turns would begin to appear in the voltage windings 58 and 76. The output of magnetic amplifier CA is then varied in accordance with the difference between the effect of the pattern winding 36 and the voltage winding 58. As this is chosen on the straight portion of the curve, the output is just the right amount to balance the difference between the pattern and voltage winding ampere turns and the net ampere turns in amplifier B. The net ampere-turns are those required to maintain an output. The maximum pattern winding ampere-turns will usually be several times larger than the net ampere-turns. The output characteristics of this drive with full pattern winding excitation is shown in Fig. 3 by the curve CA–C.

When the pattern and voltage excitations on CA balance, the output of winding 64 will be back to minimum, and the pattern and voltage excitations on B will balance with just the net excitation remaining and the generator armature current can then decrease. Our drive then operates as a voltage regulator, with the current limit out of the picture because the output of amplifier CA is a minimum.

For deceleration, or reverse acceleration, the magnetic amplifier CD goes into action. Winding 64 is not energized but winding 164 as the output of magnetic amplifier CD, is energized. The output circuit for the magnetic amplifier CD may be traced from lead L1, when this lead is positive, through rectifier 162, conductor 163, control winding 164, conductor 165, adjustable resistor 166, rectifiers 167 and 168, main winding 169, to lead L2, and from lead L2, when this lead is positive, through the main winding 170, rectifiers 171 and 172, conductor 163, control winding 164, conductor 165, adjustable resistor 166 and rectifier 173 to lead L1. This amplifier CD, being responsive to a reverse armature current and reverse voltage now effects the control illustrated by curve CD–C shown in Fig. 3. The control is thus effective in all four quadrants.

Damping transformers T1 and T2 are responsive to rapid changes in the output of amplifier B. The damping transformer T3 is responsive to rapid changes in the output of amplifier A. The output of the damping transformer T1 appears in the circuit that may be traced through resistor 200 and winding 40 of amplifier B. The output of the damping transformers T2 and T3 appears in the circuit that may be traced through the conductor 141, damping winding 142 on magnetic amplifier CA, conductor 143, damping winding 144 on magnetic amplifier CD and conductor 145 to the upper common secondary terminal 146 of the transformers T2 and T3. These damping transformers provide stabilizing feedback circuits to insure good stability which is of particular value when high gains are used, as will often be the case.

The capacitor shown connected across the primary winding of damping transformer T2 and the capacitor connected across the control coil, or winding, 64 prevents ripples from appearing across these windings and thus improves the performance of our system.

Fig. 2, as shown, will apply to the magnetic amplifier CA while on magnetic amplifier CD the direction, or polarity, of the pattern and voltage coils is reversed from that shown. The value of this scheme lies in the fact that the output of the current limit magnetic amplifiers is continuously recalibrated during a speed change so that the armature current remains constant as is indicated by the vertical slope of the current curve in Fig. 3.

Figure 1C:
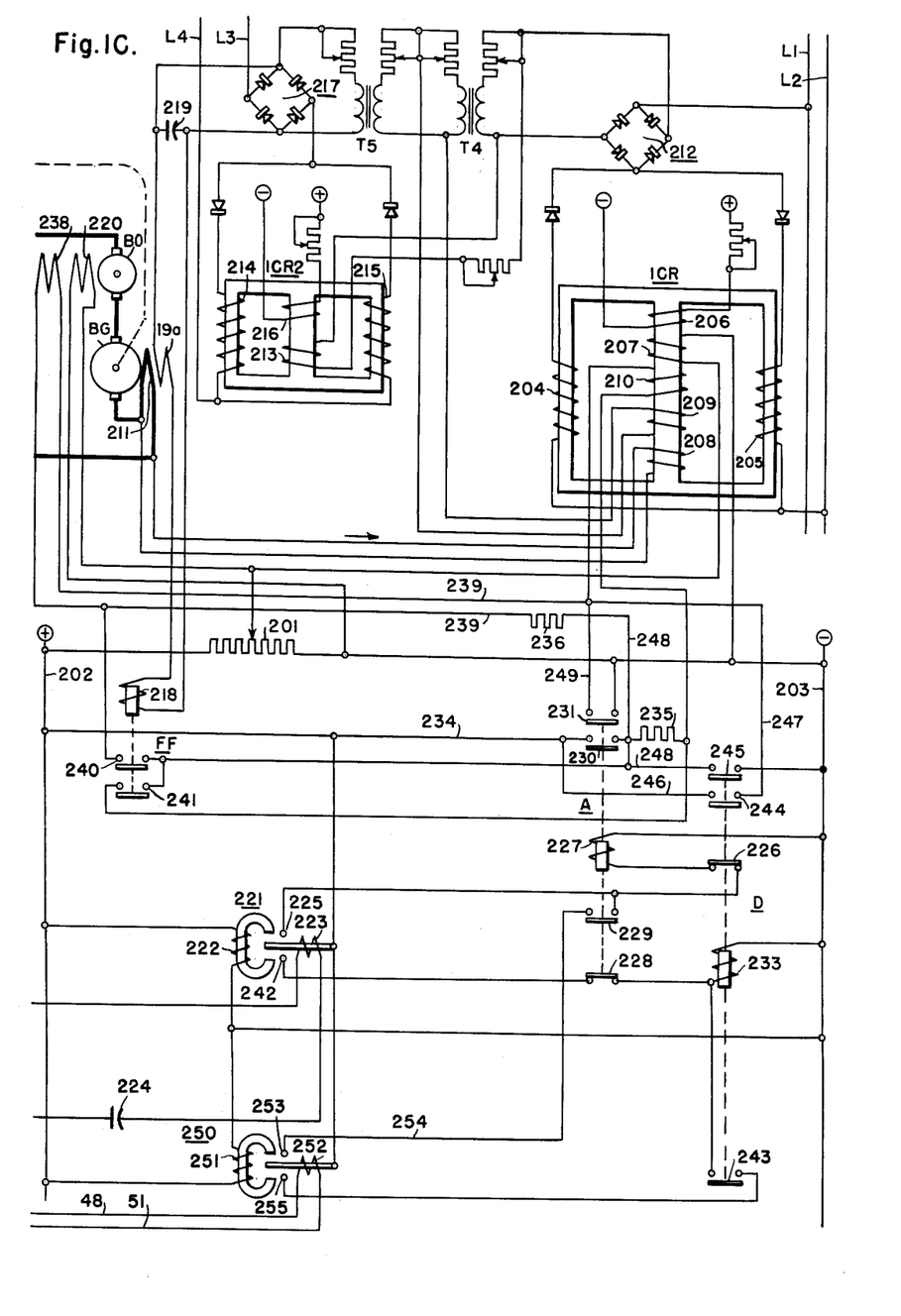
Fig. 1C shows the inertia compensation scheme employed.

The diagram of Fig. 1C shows the method of applying inertia compensation to the current limit drive system just described. A braking generator BG is mechanically coupled to the unwind reel UWR of Fig. 1B. The armature current of the unwind braking generator BG determines the tension in the strip M when the system is run at constant strip speed. A booster generator BO is provided in series with the unwind braking generator BG to supply a voltage equal to the IR drop in the unwind braking generator armature circuit. When the system is run at constant strip speed, the unwind reel UWR is rotated at a speed which varies as a function of the diameter of the reel. That is, as the material is taken from the unwind reel UWR, its speed of rotation increases. Since the speed of rotation of the unwind braking generator BG varies with the speed of the unwind reel UWR, the current in the armature circuit of the unwind braking generator BG would also vary if the excitation of the field 199 for the unwind braking generator BG remained constant. Therefore, a current regulating scheme is provided to regulate the current in the armature circuit of the braking generator BG. A potentiometer 201 is connected between the leads 202 and 203 which, in turn, are connected to the positive and negative terminals of a direct current source. The potentiometer 201 is provided to set the magnitude of the current in the armature current of the unwind braking generator BG and, thus, the tension in the strip of material M.

The regulating means for the current in the armature circuit of the unwind braking generator BG comprises the magnetic amplifiers ICR and ICR2. The magnetic amplifier ICR has main windings 204 and 205, a biasing winding 206, a tension control winding 207, a current control winding 208, a damping winding 209, and an inertia compensating winding 210. The biasing winding 206 determines the initial saturation of the core of the magnetic amplifier ICR. The tension control winding 207 is connected between the tap on the tension setting potentiometer 201 and the negative lead 203 and, thus, the setting of the tension setting potentiometer 201 determines the output of the magnetic amplifier ICR. The current control winding 208 is connected directly across the commutating field 211 of the unwind braking generator BG and, thus, its excitation is determined by the current in the armature circuit of the unwind braking generator BG. The current control winding 208 is wound on the core in such a manner that when the current flows through the control winding in the direction indicated the effect of the current control winding 208 is in opposition to the effect of the tension control winding 207 with respect to the saturation of the magnetic amplifier core. The main windings 204 and 205 of the magnetic amplifier ICR are supplied from the alternating current lines L1 and L2 through a set of rectifiers 212 connected in full-wave bridge arrangement.

The output of the magnetic amplifier ICR is applied to the primary of the damping transformer T4 and to the control winding 213 of the magnetic amplifier ICR2. Magnetic amplifier ICR2 also has main windings 214 and 215 and biasing winding 216. The biasing winding 216 is for the purpose of setting the initial saturation of the core of the magnetic amplifier ICR2, and the control winding 213 of the magnetic amplifier ICR2 is for the purpose of determining the output current of the magnetic amplifier ICR2 in accordance with the output of the magnetic amplifier ICR. The main windings 214 and 215 of the magnetic amplifier ICR2 are energized from the alternating current lines L3 and L4 through the rectifiers 217 connected in full-wave bridge arrangement. The output of the magnetic amplifier ICR2 is applied across the primary winding of the damping transformer T5 and also across the series circuit which contains the unwind braking generator field 199 and the coil 218 of the field relay FF. A smoothing capacitor 219 is also connected across the output of the magnetic amplifier ICR2, the series combination of the unwind braking generator field 199 and the coil 218 of the field relay FF. The secondaries of the damping transformers T4 and T5 are connected to each other, and the damping winding 209 of the magnetic amplifier ICR is connected across the two secondaries. The damping transformers T4 and T5 have the same purpose as the damping transformers T2 and T3 and perform their functions in a similar manner.

It may be seen then that the output of the two stages of magnetic amplification, which comprise the magnetic amplifiers ICR and ICR2, is determined by the setting of the tension setting potentiometer 201 and the current in the unwind braking generator armature circuit and, thus, the excitation of the unwind braking generator field 199 is determined by these two factors. That is, the setting of the tension setting potentiometer 201 determines the output of the two stages of magnetic amplification and the energization of the unwind braking generator field 199, the braking action of the unwind braking generator BG and, consequently, the tension in the strip of material M. The current regulating action of the current control winding 208 maintains a constant current in the armature circuit of the braking generator BG and, thus, a constant tension in the strip of material M in the following manner. As the material M is wound upon the windup reel WUR, the diameter of the unwind reel UWR decreases, thus, the speed of the unwind reel UWR and of the armature of the unwind braking generator BG increase.

When the speed of the armature of the unwind braking generator increases, it tends to generate more current in its armature circuit, thus causing an increased voltage drop across its commutator field 211. As the voltage drop across the commutating field 211 starts to rise, the energization of the current control winding 208 increases in the direction shown to decrease the saturation of the core and thus decrease the output of the magnetic amplifiers ICR and ICR2. A decrease in the output of the magnetic amplifiers results in a decrease in excitation of the unwind braking generator field 199 and, thus, the current in the armature circuit of the unwind braking generator BG is decreased. Actually, the regulation takes place continuously and the current in the circuit of the unwind braking generator BG is maintained at practically a constant value.

The main field 220 of the booster generator BO is excited from the tension setting potentiometer 201 which supplies the tension control winding 210 of the current regulating magnetic amplifier ICR so that the booster generator will supply a voltage equal to the IR drop in the armature circuit of the braking generator BG for any tension setting.

During accelartion or retardation of the system, the tension in the strip of material M depends not only on the armature current of the unwind braking generator BG, but also upon the torque necessary to change the speed of the unwind roll UWR and the unwind braking generator BG. Thus, in order to reduce the current of the unwind braking generator BG during acceleration of the system and to increase the current of the unwind braking generator BG during retardation of the system to maintain a constant tension on the strip of material M, inertia compensation means are also included in the current regulating system for the armature circuit of the braking generator BG.

The two stages of the magnetic amplifiers which comprise ICR and ICR2 are utilized to apply the inertia compensation. The inertia compensation is applied by the polarized relay 221 having the stationary coil 222 connected directly between the lines 202 and 203, and a moving coil 223 which is connected through a capacitor 224 across the speed reference voltage tapped off the speed setting resistors 12, 13, 14 and 15. At any steady set speed, the capacitor 224 will be charged up to the reference voltage, and the current through the moving coil 223 will be zero, so that the contacts of the polarized relay 221 will be open. If the speed reference voltage is changed either to increase or decrease the speed of the system, a transient current will flow to cause the polarized relay to operate and apply inertia compensation in the proper sense. For example, when the reference voltage is increased, the charging current in the capacitor will operate the moving coil 223 of the polarized relay 221 in the direction to close the moving contact against the stationary contact 225. This will complete a circuit from the lines 202 through the moving contact of the polarized relay 221 to the stationary contact 225 through the normally closed contact 226 of the deceleration contactor D, the coil 227 of the acceleration contactor A to the negative line 203.

Energization of the coil 227 of the acceleration relay A opens the contact 228 and closes the contacts 229, 230 and 231. Opening the contact 228 assures that the coil 233 of the deceleration relay D cannot be energized. Closing the contacts 230 and 231 completes the circuit from the positive line 202 through line 234, contacts 230, the inertia compensating resistor 235, the inertia compensation winding 210 on the magnetic amplifier ICR, the contacts 231 of the acceleration relay A to the negative line 203. Another circuit is completed from the line 202 through line 234, through the contacts 230, inertia compensating resistor 236, conductor 237, the inertia compensation field 238 on the booster generator BO, conductor 239, the contacts 231 of acceleration relay A to the negative line 203. Thus, it will be noted that inertia compensation winding 210 of the magnetic amplifier ICR is energized and, thus, will recalibrate the current regulator for the armature circuit of the braking generator BG by modifying the output of the magnetic amplifiers IRC and IRC2 and, consequently, the excitation of the unwind braking generator field winding 199 to a different value. The amount of recalibration applied is that amount which is necessary to accelerate the windup reel motor and the windup reel or roll. In other words, the armature current of the braking generator BG is reduced to the extent that the system may be accelerated without changing the tension of the material strip M.

The amount of recalibration of the armature current regulator for the unwind braking generator BG which is necessary to compensate for the inertia of the unwind reel UWR is determined by the amount of material on the unwind reel UWR. The amount of recalibration of the armature current regulator is set by the energization of the inertia compensation control winding 210 on the magnetic amplifier ICR and the energization of the inertia compensation field 238 for the booster generator BO. When the diameter of the unwind reel UWR is great, its inertia is high and the recalibration of the armature current regulator for the unwind braking generator BG must be a large value. When the diameter of the unwind reel UWR is small, the amount of recalibration of the armature current regulator for the unwind braking generator BG is a smaller value. In the embodiment shown, the field relay FF is used to sense the amount of recalibration necessary and, thus, is considered responsive to the inertia of the material on the unwind reel UWR.

In order to be inertia responsive, the coil 218 of the field relay FF is placed in series with the field winding 199 of the unwind braking generator BG. Since the energization of the field winding 199 is varied as the speed of rotation (i. e. reel diameter) of the armature of the unwind generator BG in order to keep a constant current in the armature circuit of the unwind braking generator BG, the current through the coil 218 of the field relay FF is also varied according to the speed of rotation of the armature of the unwind braking generator BG. It has already been pointed out that the speed of rotation of the armature of the unwind braking generator BG is a function of the diameter of the unwind reel UWR and, thus, a function of the inertia presented by the unwind reel. Thus, it may be said that the current in the coil 218 of the field relay FF is a function of the inertia which must be compensated for in the case of acceleration or deceleration of the system.

When the current through the coil 218 of the field relay FF is sufficiently high, the field relay operates to close its contacts 240 and 241. The contacts 241 short circuit the inertia compensating resistor 235 which is in series with the inertia compensating control winding 210 of the magnetic amplifier ICR, and the contacts 240 short circuit the inertia compensating resistor 236 which is in series with the inertia compensating field 238 of the booster generator BO. When the system is being accelerated as described and the inertia is high, the field relay FF will have operated and the energization of the inertia compensating control winding 210 of the magnetic amplifier will be at its maximum. The output of the magnetic amplifier ICR and, consequently, the energization of the field winding 199 of the unwind braking generator BG will be reduced a maximum amount to cause the desired tension to be maintained in the strip of material M.

If the unwind reel UWR is small, the energization of the field winding 199 of the unwind braking generator BG will be less than for a large unwind reel to maintain the desired current in the armature circuit of the unwind braking generator BG, and the current in the coil 218 of the field relay FF will not be great enough to operate the relay. Thus, the inertia compensating resistors 235 and 236 will be in series with the inertia compensating control winding 210 of the magnetic amplifier ICR and the inertia compensation field 238 of the booster generator BO, respectively. Thus, the energization of the inertia compensating control winding 210 of the magnetic amplifier ICR and the inertia compensating field winding 238 of the booster generator BO will be a minimum, and the amount of inertia compensation will not be as great as that which is applied in the case of a large unwind reel UWR. The field current at which the field relay coil 218 will cause the relay FF to operate will, of course, be determined by the particular system. In some systems, it may be desirable to have more steps of inertia compensation, but only the two steps are shown here for simplicity.

When it is desired to decelerate or retard this system, the speed reference voltage is decreased and the capacitor 224 will discharge causing current to flow in the moving coil 223 of the polarized relay 221 in such a direction as to make the moving contact close against the stationary contact 242 in which case a circuit is completed from the positive line 202 through the moving contact and stationary contact 242, through the normally closed contacts 228 of the acceleration contactor A, through the coil 233 of the deceleration contactor D to the negative line 203. Thus, the deceleration contactor D is energized to open its contacts 226 and close its contacts 243, 244 and 245. The contacts 243 simply complete a circuit to lock in the coil 233 of the deceleration contactor D. The contacts 226 are interlocking contacts which insure that the coil 227 of the acceleration contactor A is not energized while the contactor D is in its energized position. The contacts 244 and 245 complete a circuit from the positive line 202 through the conductor 234, the conductor 246, the contacts 244, conductor 247, the inertia compensating control winding 210 of the magnetic amplifier ICR, the inertia compensating resistor 235, conductor 248, the contacts 245 to the negative line 203. A circuit is also completed from the positive line 202 through the conductor 234, conductor 246, contacts 244, conductor 247, conductor 239, the inertia compensating field 238 of the booster generator BO, the conductor 237, inertia compensating resistor 236, conductor 248, contacts 245 to the negative line 203. Thus, it is seen that the inertia compensating control winding 210 of the magnetic amplifier ICR and the inertia compensating field winding 238 of the booster generator BO are energized as for acceleration of the system except they are energized in the opposite sense and, therefore, the recalibration of the armature current regulator for the unwind braking generator BG is, in a sense, to increase the energization of the field winding 199 of the unwind braking generator BG and, thus, allow a current in the armature circuit of the unwind braking generator BG which will cause an increased braking action upon retardation of the system to maintain a constant tension of the strip material M. Again, the amount of inertia compensation applied is determined by the inertia compensating resistors 235 and 236.

It has already been explained that if the unwind reel UWR is large, the field relay FF will be energized and the resistors 235 and 236 will be short circuited. Thus, the inertia compensating control winding 210 of the magnetic amplifier ICR and the inertia compensating field winding 238 of the booster generator BO will have their maximum energization. Thus, the energization of the field winding 199 of the braking generator BG will be increased a maximum amount and, therefore, the braking effect of the unwind braking generator BG will be a maximum when the system is being decelerated with a large unwind reel.

For a small unwind reel, the field relay FF will not operate and the inertia compensating resistors will be in series with their respective inertia compensating windings and the energization of the field winding 199 of the unwind braking generator will be increased by an amount which is necessary to provide the required braking action to keep the tension in the strip of material M constant during deceleration of the system. This amount of braking action, of course, is not as great as the braking required for a full unwind reel.

Another polarized relay 250 is utilized to maintain the inertia compensation during an acceleration or deceleration period and to release it at the end of the period. The polarized relay 250 has a stationary coil 251 connected between the positive and negative lines 202 and 203. The moving coil 252 of the polarized relay 250 is connected by the conductors 48 and 51 across the interpole winding of the main generator G at the terminals 47 and 52. The polarized relay 250 is adjusted to operate at a value of current through the interpole winding of the main generator G which is higher than the normal steady-state load on the generator, but which is lower than the value for which the current limit is set. When the line is accelerating with current limit, the polarized relay 250 is energized in such a manner that its moving contact will close against the stationary contact 253 for acceleration of the system. The acceleration contactor A is energized, and when the moving contact of the polarized relay 250 closes against the stationary contact 253, it completes a circuit from the positive line 202 through a moving contact and the stationary contact 253 of the polarized relay 250, through the conductor 254, contacts 229 of acceleration contactor A, contacts 226 of deceleration contactor D, the coil 227 of the acceleration contactor A to the negative line 203. Thus, the coil 227 of the acceleration relay A is sealed in the circuit until the polarized relay 250 is deenergized and, thus, it is independent of deenergization of the polarized relay 221. As the voltage of the main generator G approaches the value which matches the reference set on the speed adjusting resistors 12, 13, 14 and 15, the current limit will no longer be maintained as has already been described and the polarized relay 250 will open. Thus, removing the inertia compensation from the reel drive.

When the system is decelerating, the moving contact of the polarized relay 250 will be closed against the stationary contact 255 to complete a circuit from the positive lead 202 through the moving contact and stationary contact 255 of the polarized relay 250 through the contacts 243 of the deceleration contactor D through the coil 233 of the deceleration contactor D to the negative line 203. Consequently, the deceleration contactor D is made independent of the polarized relay 221. Again, as the voltage of the main generator G approaches the value which matches the reference set on the speed adjusting resistors 12, 13, 14 and 15, the decelerating current limit will no longer be maintained and the polarized relay 250 will open to deenergize the coil 233 of the deceleration contactor D and remove the inertia compensation from the reel drive system. The purpose of interlocking the acceleration and deceleration contactors A and D, respectively, is to keep them both from being energized at the same time, and thus the polarized relay 221 must always initiate the operation and the polarized relay 250 can then maintain it and release it at the proper time. Relay 221 is anticipatory in action and applies inertia compensation simultaneously with the beginning of a speed change. Applying the inertia in this manner prevents the material M from being parted even when the winder drive is handling relatively light paper. Inertia compensation is maintained throughout the speed change period until such time as generator current actually returns to normal indicating that the speed change has been completed.

Figure 1D:
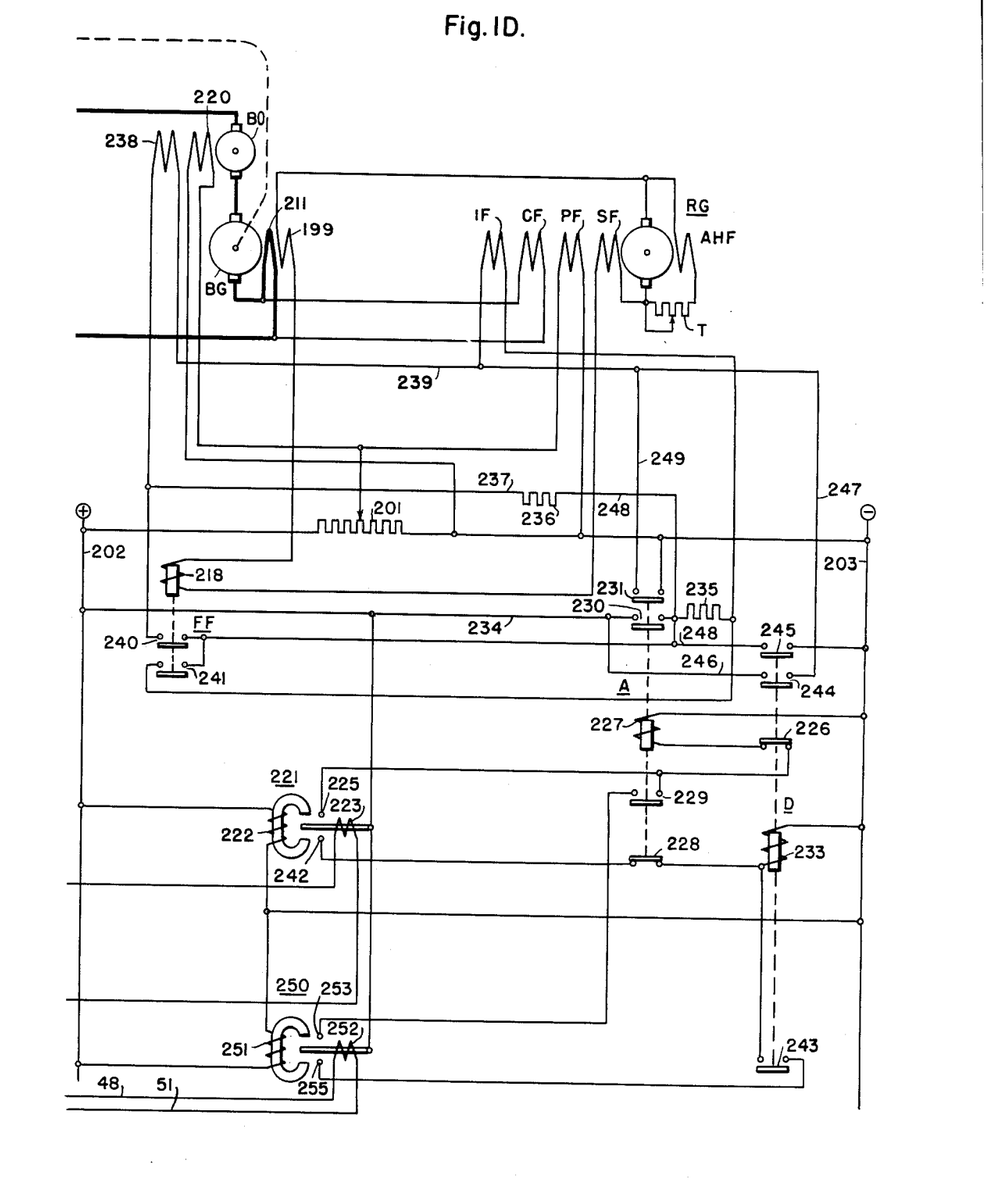

The diagram of Fig. 1D shows the method of applying inertia compensation to the current limit drive system where a rotating amplifier is used instead of the magnetic amplifiers shown in Fig. 1C. The components and circuits of Fig. 1D are generally the same as those shown in Fig. 1C and are numbered correspondingly. The main difference in the two circuits is that the two magnetic amplifiers ICR and ICR2 are omitted in Fig. 1D and the regulating generator RG is added.

The regulating generator RG is connected to supply the field 199 of the braking generator BG and the coil 218 of the field relay FF just as the magnetic amplifiers ICR and ICR2 of Fig. 1C. The regulating generator RG has a pattern field PF which corresponds to the tension setting control winding 207 of the magnetic amplifier ICR, a current limit field CF which corresponds to the current limit control winding 208, and an inertia compensating field IF which corresponds to the inertia compensating control winding 210. In addition the regulating generator RG has a self-energizing field SF and an anti-hunt field AHF. The anti-hunt field winding AHF is connected in series with a tuning resistor T and the two are effectively controlled in parallel with the series combination of the self-energizing field winding SF, the field winding 199 of the braking generator BG, and the coil 218 of the field relay FF. The self-energizing field winding SF and the anti-hunt field winding AHF are connected in opposition and the value of the tuning resistor T and the load resistance (comprising the field 199 and the coil 218) are such that the difference in ampere turns is preferably just sufficient to maintain the generated voltage of the regulating generator RG at a point on its air gap line so that the other fields are only called upon to provide a slight additive or subtractive effect on the net field to shift the voltage of the regulating generator RG a higher or lower value. Since the regulating generator is operating substantially on its air gap line it acts as a sensitive amplifier having a high amplification ratio.

The pattern field PF is connected to receive its excitation from the tension adjusting rheostat 201 to set the output of the regulating generator RG. The output of the regulating generator controls the strip tension in the same manner as the magnetic amplifiers ICR and ICR2 of Fig. 1C.

The current limit field CF regulates the current in the armature circuit of the braking generator BG. It is connected to receive its excitation from across the commutating winding 211 of the braking generator BG and to decrease the net excitation of the regulating generator RG for a current flow of the direction shown. Thus an increase of current in the circuit of the armature of the braking generator of such a sense as to cause an increase of current in the current limit field CF will cause an immediate decrease in the output of the regulating generator and thus the current in the armature of the braking generator will return to the selected value. Any decrease of current of the direction shown or increases of current in the opposite direction will cause an increase of excitation for the regulating generator RG and the braking generator BG.

The relays 221, 250, and FF, and the contactors A and D are connected in precisely the same manner as described for the circuit of Fig. 1C and the inertia compensating field IF is energized in the same manner for both acceleration and retardation of the system as the inertia compensating control winding 210 of the magnetic amplifier ICR. The inertia compensating field IF is wound in such a direction as to decrease the net excitation of the regulating generator RG when the accelerating contactor A is picked up and increase the net excitation when the decelerating contactor D is picked up. That is, the armature current of the braking generator BG is reduced during acceleration and increased during retardation to main a constant tension in the strip of material M.

From the foregoing discussion, it will be appreciated that the objects of the invention have been accomplished by providing a system which will supply the proper inertia compensation while accelerating or decelerating a drive system having a current limit control.

While but one embodiment of the invention and one application thereof have been shown, it is to be understood that the invention is capable of various adaptations and applications and that changes and modifications may be made which all come within the spirit of the invention.

We claim as our invention:

1. A system for an electric reel drive comprising a motor, a main generator connected in a loop circuit with said motor for supplying it with driving energization, a braking generator connected in shunt with said motor and said main generator, the speed of said braking generator being a function of the inertia of the motor and its load, a current regulator for said braking generator, controller means to determine the voltage output of said main generator, a first relay means responsive to a change of the controller means to recalibrate the current regulator for said braking generator, a second relay means to remove the recalibration from the system when the main generator voltage is within a predetermined proximity to the voltage output set for the main generator by the controller means.

2. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a current regulator for said braking generator, controller means to determine the voltage output of said main generator, a first relay means having a coil connected in series with a capacitor, said coil and capacitor being connected across a voltage source determined by said controller means to be responsive to a change of the controller means to recalibrate the current regulator for said braking generator.

3. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a current regulator for said braking generator, controller means to determine the voltage output of said main generator, a first relay means having a coil connected in series with a capacitor, said coil and capacitor being connected across a voltage source determined by said controller means to be responsive to a change of the controller means to recalibrate the current regulator for said braking generator, a second relay means to remove the recalibration from the system when the main generator voltage is within a predetermined proximity to the voltage output set for the main generator by the controller means.

4. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, a current regulator for said braking generator, controller means to determine the voltage output of said main generator, a first relay means responsive to a change of the controller means to recalibrate the current regulator for said braking generator.

5. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, a current regulator for said braking generator, controller means to determine the voltage output of said main generator, a first relay means responsive to a change of the controller means to recalibrate the current regulator for said braking generator, a second relay means to remove the recalibration from the system when the main generator voltage is within a predetermined proximity to the voltage output set for the main generator by the controller means.

6. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, a current regulator for said braking generator, controller means to determine the voltage output of said main generator, a first relay means having a coil connected in series with a capacitor, said coil and capacitor being connected across the voltage source determined by said controller means to be responsive to a change of the controller means to recalibrate the current regulator for said braking generator.

7. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, a current regulator for said braking generator, controller means to determine the voltage output of said main generator, a first relay means having a coil connected in series with a capacitor, said coil and capacitor being connected across a voltage source determined by said controller means to be responsive to a change of the controller means to recalibrate the current regulator for said braking generator, a second relay means to remove the recalibration from the system when the main generator voltage is within a predetermined proximity to the voltage output set for the main generator by the controller means.

8. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a current regulator for said braking generator, controller means to vary the speed of said motor, a first relay means responsive to a change of the controller means to increase the value of current limit of the current regulator for said braking generator during retardation of said motor and decrease the value of current limit during acceleration of said motor.

9. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a current regulator for said braking generator, controller means to vary the speed of said motor, a first relay means responsive to a change of the controller means to increase the value of current limit of the current regulator for said braking generator during retardation of said motor and decrease the value of current limit during acceleration of said motor, a second relay means to remove the recalibration from the system when the main generator voltage is within a predetermined proximity to the voltage output set for the main generator by the controller means.

10. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a current regulator for said braking generator, controller means to vary the speed of said motor, a first relay means having a coil connected in series with a capacitor, said coil and capacitor being connected across a voltage source which is determined by said controller means to increase the value of current limit of the current regulator for said braking generator during retardation of said motor, and decrease the value of current limit during acceleration of said motor.

11. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a current regulator for said braking generator, controller means to vary the speed of said motor, a first relay means having a coil connected in series with a capacitor, said coil and capacitor being connected across a voltage source which is determined by said controller means to increase the value of current limit of the current regulator for said braking generator during retardation of said motor, and decrease the value of current limit during acceleration of said motor, a second relay means to remove the recalibration from the system when the main generator voltage is within a predetermined proximity to the voltage output set for the main generator by the controller means.

12. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, a current regulator for said braking generator, controller means to vary the speed of said motor, a first relay means having a coil connected in series with a capacitor, said coil and capacitor being connected across a voltage source which is determined by said controller means to increase the value of current limit of the current regulator for said braking generator during retardation of said motor, and decrease the value of current limit during acceleration of said motor.

13. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, a current regulator for said braking generator, controller means to vary the speed of said motor, a first relay means having a coil connected in series with a capacitor, said coil and capacitor being connected across a voltage source which is determined by said controller means to increase the value of current limit of the current regulator for said braking generator during retardation of said motor, and decrease the value of current limit during acceleration of said motor, a second relay means to remove the recalibration from the system when the main generator voltage is within a predetermined proximity to the voltage output set for the main generator by the controller means.

14. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, potentiometer means to determine the excitation of said first excitation means, a current regulator for said braking generator, controller means to determine the voltage output of said main generator, a first relay means responsive to a change of the controller means to recalibrate the current regulator for said braking generator and determine the excitation of said second excitation means for said booster generator.

15. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, potentiometer means to determine the excitation of said first excitation means, a current regulator for said braking generator, controller means to determine the voltage output of said main generator, a first relay means responsive to a change of the controller means to recalibrate the current regulator for said braking generator and determine the excitation of said second excitation means for said booster generator, a second relay means to remove the recalibration from the system and remove the excitation from said second excitation means for said booster generator when the main generator voltage is within a predetermined proximity to the voltage output set for the main generator by the controller means.

16. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second generator, a first and a second excitation means for said booster generator, a potentiometer means to determine the excitation of said first excitation means, a current regulator for said braking generator, controller means to determine the voltage output of said main generator, a first relay means having a coil connected in series with a capacitor, said coil and capacitor being connected across a voltage source determined by said controller means to be responsive to a change of the controller means to recalibrate the current regulator for said braking generator and determine the excitation of said second excitation means for said booster generator.

17. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second generator, a first and a second excitation means for said booster generator, potentiometer means to determine the excitation of said first excitation means, a current regulator for said braking generator, controller means to determine the voltage output of said main generator, a first relay means having a coil connected in series with a capacitor, said coil and capacitor being connected across a voltage source determined by said controller means to be responsive to a change of the controller means to recalibrate the current regulator for said braking generator and determine the excitation of said second excitation means for said booster generator, a second relay means to remove the recalibration from the system and remove the excitation from said second excitation means for said booster generator when the main generator voltage is within a predetermined proximity to the voltage output set for the main generator by the controller means.

18. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, potentiometer means to determine the excitation of said first excitation means, a current regulator for said braking generator, controller means to vary the speed of said motor, a first relay means responsive to a change of the controller means to increase the value of current limit of the current regulator for said braking generator during retardation of said motor and decrease the value of current limit during acceleration of said motor and determine the excitation of said second excitation means for said booster generator.

19. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, potentiometer means to determine the excitation of said first excitation means, a current regulator for said braking generator, controller means to vary the speed of said motor, a first relay means responsive to a change of the controller means to increase the value of current limit of the current regulator for said braking generator during retardation of said motor and decrease the value of current limit during acceleration of said motor, a second relay means to remove the recalibration from the system and remove the excitation from said second excitation means for said booster generator when the main generator voltage is within a predetermined proximity to the voltage output set for the main generator by the controller means.

20. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, potentiometer means to determine the excitation of said first excitation means, a current regulator for said braking generator, controller means to vary the speed of said motor, a first relay means having a coil connected in series with a capacitor, said coil and capacitor being connected across a voltage source which is determined by said controller means to increase the value of current limit of the current regulator for said braking generator during retardation of said motor, and decrease the value of current limit during acceleration of said motor and determine the excitation of said second excitation means for said booster generator.

21. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, potentiometer means to determine the excitation of said first excitation means, a current regulator for said braking generator, controller means to vary the speed of said motor, a first relay means having a coil connected in series with a capacitor, said coil and capacitor being connected across a voltage source which is determined by said controller means to increase the value of current limit of the current regulator for said braking generator during retardation of said motor, and decrease the value of current limit during acceleration of said motor, a second relay means to remove the recalibration from the system and remove the excitation from said second excitation means for said booster generator when the main generator voltage is within a predetermined proximity to the voltage output set for the main generator by the controller means.

22. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means responsive to a change of the controller means to cause said third control winding to be energized.

23. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means responsive to a change of the controller means to cause said third control winding to be energized, a second relay means to remove the energization from the third control winding when the main generator voltage is within a preselected proximity to the voltage output set for the main generator by the controller means.

24. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, braking generator excitation means, means for controlling the excitation of said braking generator in accordance with a preselected value, the armature current of the braking generator, and the inertia of the motor and its load, a controller means to determine the voltage output of said main generator, a first relay means responsive to a change of the controller means to cause the braking generator excitation means to be influenced by the inertia of the motor and its load.

25. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, braking generator excitation means, means for controlling the excitation of said braking generator in accordance with a preselected value, the armature current of the braking generator, and the inertia of the motor and its load, a controller means to determine the voltage output of said main generator, a first relay means responsive to a change of the controller means to cause the braking generator excitation means to be influenced by the inertia of the motor and its load, a second relay means to remove the influence of the inertia of the motor and its load from the excitation means for the braking generator.

26. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means having a coil connected in series with a capacitor, said coil and capacitor being connected across a voltage source determined by said controller means to be responsive to a change of the controller means to cause said third control winding to be energized.

27. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means having a coil connected in series with a capacitor, said coil and capacitor being connected across a voltage source determined by said controller means to be responsive to a change of the controller means to cause said third control winding to be energized, a second relay means to remove the energization from said third control winding when the main generator voltage is within a preselected proximity to the voltage output set for the main generator by the controller means.

28. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means responsive to a change of the controller means to cause said third control winding to be energized.

29. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means responsive to a change of the controller means to cause said third control winding to be energized, a second relay means to remove energization from the third control winding when the main generator voltage is within a preselected proximity to the voltage output set for the main generator by the controller means.

30. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means having a coil connected in series with a capacitor, said coil and capacitor being connected across a voltage source determined by said controller means to be responsive to a change of the controller means to cause said third control winding to be energized.

31. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator armature circuit, braking generator excitation means, saturable core impedance means for controlling the excitation of said braking generator excitation means, a first control winding for said saturable core impedance means to determine the output of said saturable core impedance means in accordance with a preselected value, a second control winding for determining the output of said saturable core impedance means in accordance with the armature current of the braking generator, a third control winding for controlling the output of said saturable core impedance means in accordance with the inertia of the motor and its load, controller means to determine the voltage output of said main generator, a first relay means having a coil connected in series with a capacitor, said coil and capacitor being connected across a voltage source determined by said controller means to be responsive to a change of the controller means to cause said third control winding to be energized, a second relay means to remove the energization from said third control winding when the main generator voltage is within a preselected proximity to the voltage output set for the main generator by the controller means.

32. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means responsive to a change of the controller means to cause said third control winding and said second excitation means to be energized.

33. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means responsive to a change of the controller means to cause said third control winding and said second excitation means to be energized, a second relay means to remove the energization from the third control winding and the second excitation means when the main generator voltage is within a preselected proximity to the voltage output set for the main generator by the controller means.

34. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means having a coil in series with a capacitor, said coil and capacitor being connected across a voltage source determined by said controller means to be responsive to a change of the controller means to cause said third control winding and said second excitation means to be energized.

35. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means having a coil in series with a capacitor, said coil and capacitor being connected across a voltage source determined by said controller means to be responsive to a change of the controller means to cause said third control winding and said second excitation means to be energized, a second relay means to remove the energization from said third control winding when the main generator voltage is within a preselected proximity to the voltage output set for the main generator by the controller means.

36. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means responsive to a change of the controller means to cause said third control winding and said second excitation means to be energized, an inertia compensation relay means having its coil connected to be responsive to a condition of the braking generator energization means to select the amount of energization of said third control winding and said second excitation means.

37. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means responsive to a change of the controller means to cause said third control winding and said second excitation means to be energized, an inertia compensation relay means having its coil connected to be responsive to a condition of the braking generator energization means to select the amount of energization of said third control winding and said second excitation means to be energized, a second relay means to remove the energization from the third control winding and the second excitation means when the main generator voltage is within a preselected proximity to the voltage output set for the main generator by the controller means.

38. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means having a coil in series with a capacitor, said coil and capacitor being connected across a voltage source determined by said controller means to be responsive to a change of the controller means to cause said third control winding and said second excitation means to be energized, an inertia compensation relay means having its coil connected to be responsive to a condition of the braking generator energization means to select the amount of energization of said third control winding and said second excitation means to be energized.

39. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, a first and a second excitation means for said booster generator, braking generator excitation means, saturable core impedance means for controlling the excitation of said braking generator excitation means, a first control winding for said saturable core impedance means to determine the output in accordance with a preselected value, a second control winding for determining the output of said saturable core impedance means in accordance with the armature current of the braking generator, a third control winding for controlling the output of said saturable core impedance means in accordance with the inertia of the motor and its load, potentiometer means to determine the excitation of said first excitation means and said first control winding, controller means to determine the output of said main generator, a first relay means having a coil in series with a capacitor, said coil and capacitor being connected across a voltage source determined by said controller means to be responsive to a change of the controller means to cause said third control winding and said second excitation means to be energized, an inertia compensation relay means having its coil connected to be responsive to a condition of the braking generator energization means to select the amount of energization of said third control winding and said second excitation means to be energized, a second relay means to remove the energization from said third control winding when the main generator voltage is within a preselected proximity to the voltage output set for the main generator by the controller means.

40. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, braking generator excitation means, a regulating generator for controlling the excitation of said braking generator excitation means, first excitation means for said regulating generator to determine the net excitation of said regulating generator in accordance with a preselected value, a second excitation means for said regulating generator in accordance with the armature current of the braking generator, a third excitation means for said regulating generator in accordance with the motor and its load, controller means to determine the voltage output of said main generator, a first relay means responsive to a change of the controller means to cause said third excitation means to be energized, a second relay means to remove the energization from the third energization means when the main generator voltage is within a preselected proximity to the voltage output set for the main generator by the controller means.

41. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator to supply a voltage equal to the IR drop in the braking generator circuit, braking generator excitation means, a regulating generator for controlling the excitation of said braking generator excitation means, first excitation means for said regulating generator to determine the net excitation of said regulating generator in accordance with a preselected value, a second excitation means for said regulating generator in accordance with the armature current of the braking generator, a third excitation means for said regulating generator in accordance with the motor and its load, controller means to determine the voltage output of said main generator, a first relay means responsive to a change of the controller means to cause said third excitation means to be energized, a second relay means to remove the energization from the third energization means when the main generator voltage is within a preselected proximity to the voltage output set for the main generator by the controller means.

42. A system for an electric reel device comprising a motor, a main generator connected in a loop circuit with said motor for supplying it with driving energization, a braking generator connected in shunt with said motor and said main generator, the speed of said braking generator being a function of the inertia of the motor and its load, a booster generator in series with said braking generator, braking generator excitation means, a regulating generator for controlling the excitation of said braking generator excitation means, first excitation means for said regulating generator to determine the net excitation of said regulating generator in accordance with a preselected value, a second excitation means for said regulating generator in accordance with the armature current of the braking generator, a third excitation means for said regulating generator in accordance with the motor and its load, controller means to determine the voltage output of said main generator, a first relay means responsive to a change of the controller means to cause said third excitation means for said regulating generator and said second excitation means for said booster generator to be energized, an inertia compensation relay means having its coil connected to be responsive to a condition of the braking generator energization means to select the amount of energization of said third energization means for said regulating generator and said second excitation means for said booster generator.

References Cited in the file of this patent

UNITED STATES PATENTS 2,437,973    Schmitz _______________ Mar. 16, 1948